2,820,815

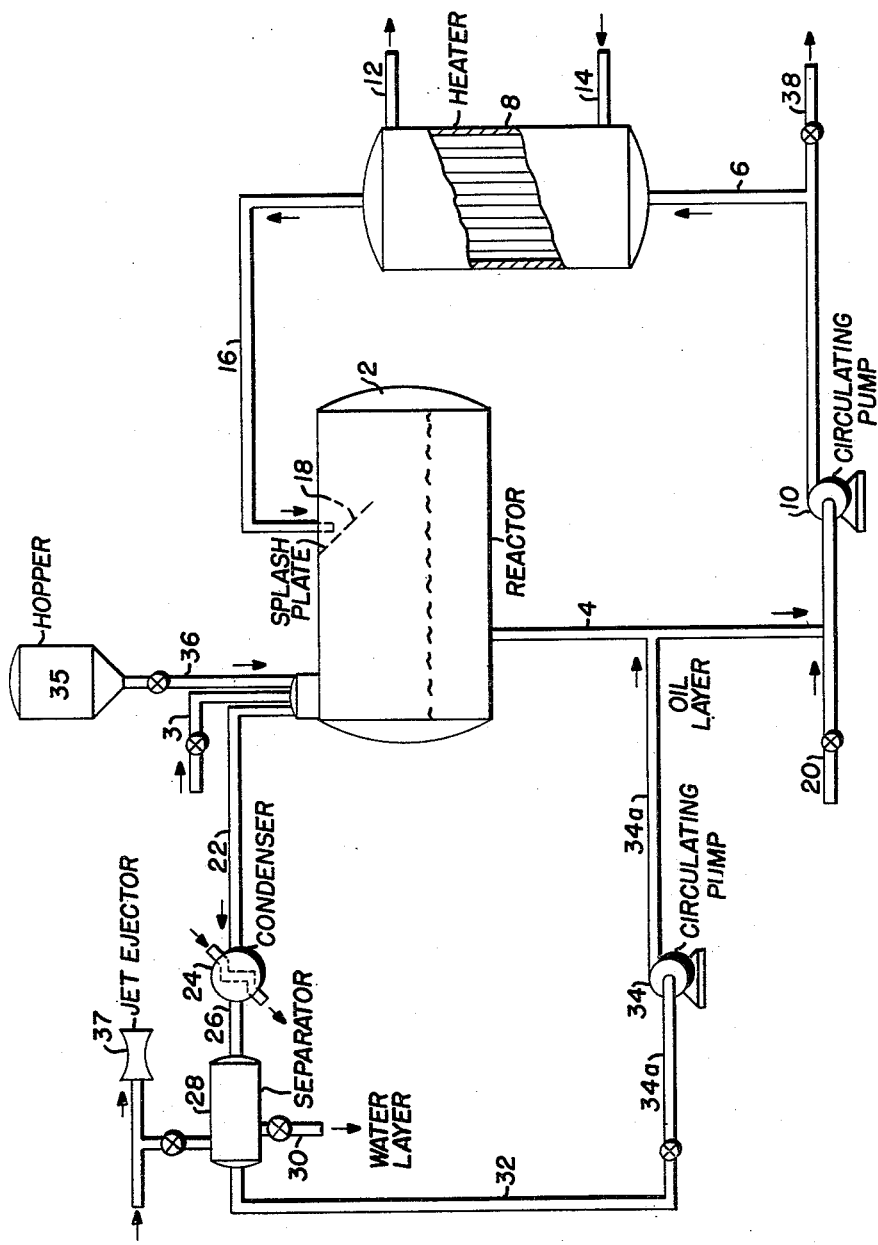
Alfred H. Matuszak
Daniel S. Maisel
E. Wendell Carrier
Inventors
By L. F. Mart    Attorney

SYNTHETIC LUBRICATING COMPOSITIONS AND PROCESS FOR THEIR PREPARATION

Alfred H. Matuszak, Westfield, Daniel S. Maisel, Union, and E. Wendell Carrier, Cranford, N. J., assignors to Esso Research and Engineering Company, a corporation of Delaware Application April 8, 1954, Serial No. 421,822

4 Claims. (Cl. 260—485)

This invention relates to synthetic lubricating compositions and to a process for their preparation. Particularly, the invention relates to complex ester type synthetic lubricants such as those formed from glycols, dibasic acids and alcohols. The invention also relates to a new process for the preparation of these complex esters by use of equipment which obviates many of the technical difficulties of presently used processes.

Complex ester type synthetic lubricating oils prepared by combinations of glycols, dibasic acids, monobasic acids and alcohols are well known in the art of synthetic lubricant manufacture. These esters are constructed from the above compounds on the following general types:

I. Glycol centered complex esters, i. e. alcohol-dibasic acid (glycol-dibasic acid)$_x$ alcohol
II. Dibasic acid centered complex esters, i. e. monobasic acid-glycol (dibasic acid-glycol)$_x$ monobasic acid
III. Alcohol-acid terminated complex esters, i. e. monobasic acid (glycol-dibasic acid)$_x$ alcohol wherein $x$ is a number greater than zero.

Complex esters are described in detail in U. S. Patents 2,575,195, 2,575,196, and in copending application Serial No. 52,429, filed October 1, 1948, now issued as U. S. Patent No. 2,703,811.

These complex ester materials are prepared by a combination of alcohols, monobasic acids, dibasic acids and glycols in various fashions. Operable alcohols include the following:

Methyl alcohol
Ethyl alcohol
n-Butyl alcohol
n-Hexyl alcohol
2-ethyl butyl alcohol
n-Octyl alcohol
2-ethylhexyl alcohol
Cetyl alcohol
Oleyl alcohol
Ethylene glycol mono-n-butyl ether
Ethylene glycol mono-2-ethylbutyl ether
Ethylene glycol mono-2-ethylhexyl ether
Ethylene glycol mono-tert.-octyl ether
β-n-Butylmercaptoethanol
β-tert.-Octylmercaptoethanol
β-n-Dodecylmercaptoethanol
Diethylene glycol mono-n-butyl ether
Diethylene glycol mono-2-ethylbutyl ether
Diethylene glycol mono-2-ethylhexyl ether
Propylene glycol mono-butyl thioether
Propylene glycol mono-tert.-octyl thioether
Propylene glycol mono-n-dodecyl thioether
n-Butylmercaptoethoxyethanol
tert.-Octylmercaptoethoxyethanol
n-Dodecylmercaptoethoxyethanol
n-Butylmercaptopropoxypropanol
tert.-Octylmercaptopropoxypropanol
Propylene glycol mono-n-butyl ether
Dipropylene glycol monomethyl ether
Dipropylene glycol monoethyl ether
Dipropylene glycol mono-n-butyl ether
Tripropylene glycol monomethyl ether
Tripropylene glycol monoethyl ether
Tripropylene glycol mono-n-butyl ether
Propylene glycol monoisopropyl ether
Dipropylene glycol monoisopropyl ether
Tripropylene glycol monoisopropyl ether Many of the above listed ether alcohols, formed by the reaction of ethylene oxide or propylene oxide with aliphatic alcohols, are known in the industry as "Dowanols," "Carbitols," or "Cellosolves."

A group of alcohols especially adapted for use in connection with the present invention are the so-called "Oxo" alcohols, prepared by the reaction of carbon monoxide and hydrogen upon the olefins obtainable from petroleum products. Materials such as diisobutylene and $C_7$ olefins are suitable for this purpose; also higher and lower molecular weight olefinic materials are sometimes employed. The alcohols obtained in this manner normally have a branched chain structure.

Among the monobasic acids which may be employed in the preparation of the esters of the present invention, the following may be listed as illustrative:

Acetic acid
Propionic acid
Butyric acid
Valeric acid
Caproic acid
Caprylic acid
Pelargonic acid
Lauric acid
Palmitic acid
Stearic acid
Oleic acid
β-Methoxypropionic acid
β-Ethoxypropionic acid
β-tert.-Octoxypropionic acid
β-Ethylmercaptopropionic acid
β-tert.-Octylmercaptopropionic acid
β-tert.-Dodecylmercaptopropionic acid
Any of the various "Oxo" acids Illustrative examples of the dibasic acids which may be employed in the synthesis of the complex esters of the present invention are the following:

Oxalic acid
Malonic acid
Succinic acid
Glutaric acid
Adipic acid
Pimelic acid
Suberic acid
Azelaic acid
Sebacic acid
Brassylic acid
Pentadecanedicarboxylic acid
Tetracosanedicarboxylic acid
$C_4$–$C_{24}$ alkenylsuccinic acids
Diglycolic acid
Thiodiglycolic acid Carbon-alkyl derivatives of the above acids as, e. g., 2-methyl adipic acid The $C_4$-$C_{24}$ alkenylsuccinic acids listed above are prepared by condensing olefins or mixtures of olefins with maleic anhydride.

The glycols employed in preparing the esters of the present invention include ethylene glycol and any of the paraffinic homologues of the same containing up to 18 carbon atoms. These may include, for example, ethylene glycol, propylene glycol, butylene glycols, pinacol, trimethylene glycol, tetramethylene glycol, pentamethylene glycol and the like. Compounds such as diethylene glycol, triethylene glycol, the polyoxyethylene glycols of the formula:

wherein $n$ is 1 to 26, and the polyoxypropylene glycols of the general formula

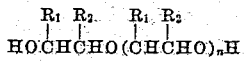

where either $R_1$ or $R_2$ is a methyl group and the other is hydrogen, and where $n$ is 1 to 20, may likewise be employed. Glycols containing sulfur atoms in thioether linkages may also be employed, and these include compounds as thiodiglycol and 1,2-bis (2-hydroxyethylmercapto) ethane. There also may be used glycols containing both oxygen and sulfur in similar linkages; such a compound is bis-2-(2-hydroxyethoxy) ethyl sulfide.

The preparation of these complex ester synthetic lubricants may be carried out in a one-step or a two-step process, as desired. The two-step process generally used proceeds as follows:

(1) PREPARATION OF HALF-ESTER OF GLYCOL AND DIBASIC ACID

In a reaction zone, usually a glass-lined steel agitated and jacketed vessel, there is charged the dibasic acid, the glycol, a catalyst, such as sodium acid sulfate, and a water entrainer in the desired amounts. The reaction is then carried out by heating at reflux temperatures until the desired acid number is attained. This ordinarily takes from 2 to 10 hours, depending largely upon the reaction temperature and rate of heat input to the batch. The temperature should not be allowed to exceed about 400° F. during half-ester preparation. If the reaction temperature is allowed to exceed about 400° F., undesirable product formation may result.

The presence of trace amounts of oxygen during processing has been found to contribute to high acid numbers and corrosivity of the product, so that a great deal of attention must be given to exclusion of air. The reaction vessel is tested for air leakage before use.

(2) ESTERIFICATION OF THE HALF-ESTER

When the half-ester reaction is completed the temperature of the reactor is lowered if necessary to add the desired amount of alcohol rapidly. When foaming is encountered it is usually controlled by pressuring with a few pounds of nitrogen. The reactor is then heated to about 400 to 430° F. and the esterification is allowed to proceed until completed, usually from about 2 to 10 hours. The temperature here too is critical and should not be allowed to exceed about 430° F.

(3) PRODUCT PURIFICATION

The reaction product is stripped as completely as possible of excess entrainer and low-boiling reactants at atmospheric pressure. In this stripping step the temperature must again be carefully controlled (below 450° F.). If foaming is encountered, it may be controlled by using nitrogen pressure momentarily. When the atmospheric stripping is substantially complete, the pressure is lowered gradually to 10-30 mm. Hg absolute pressure and stripping continued until a product of the desired viscosity is attained. The material is then washed to remove acidic materials and may be further stripped under vacuum to obtain the desired flash point and viscosity.

In another two-step process the required amount of alcohol is reacted with the dibasic acid to give the acid half-ester. This is reacted with the required amount of glycol to give the crude complex ester which is then treated substantially as described above under product purification.

In the one-step process all of the ingredients are co-mixed and esterified together to a maximum temperature of 430° F. for from 2 to 10 hours. The resulting crude complex ester is then treated as described under product purification.

Although type I complex esters have been described, those of type II and III are prepared by similar techniques.

As was pointed out in the above description of the preparation of these complex esters, there are several disadvantages inherent in this process. Air leakage into the reaction and stripping zones is very difficult to control. Mixing is usually obtained by a stirrer which must pass through a stuffing box and air leakage very often occurs at this point. As is the case with batch reactions of this type, when the total amount of each ingredient is added at one time, the formation of undesirable products may result, e. g., one mol of glycol may react with one mol of dibasic acid to form a ring compound. Addition of the total amount of alcohol at one time may prevent stepwise esterification of the half ester and may increase the possibility of forming undesirable materials. Foaming may decrease reactor capacity and prevent attaining desired production rates. Temperature control is difficult and rates of heat transfer are relatively low when the mass is heated by wall contact. Different vessels are used for different steps due to character of the treatment. Another important disadvantage is the presence of a liquid head during low pressure stripping. This limits the amount of unused reactants which can be stripped or conversely increases the temperature to which the product must be heated to obtain a specified viscosity. It has now been found, and forms one object of this invention, that these disadvantages may be overcome by a process involving the use of a circulating system wherein the product and the compounds are continuously circulated from a reaction zone through a heating zone and back to the reaction zone.

As described below several important advantages may be obtained by the inventive process. These include (1) minimum time during which reactants must be held at high temperatures, (2) elimination of foaming problems and, hence, decreased stripping and reaction periods, (3) increased rate of heat transfer which allows a more accurate control of temperature and minimizes starting up time, (4) variation as desired in the proportions of reactants present in the reaction zone at one time to give improved quality of product over that attainable in the conventional system, and (5) substantial elimination of leakage of oxygen into the reaction system.

The instant process will be more clearly explained by reference to the accompanying drawing. In the drawing, Fig. 1 represents a flow plan of the process. The process of this invention may involve any of the above described processes (i. e., either two-step or one-step). It may be carried out as follows:

There is charged to reactor drum 2 through valved line 3 the desired amount of a polyhydric material. Although the glycols such as the polyethylene glycols are preferred, any of the polyhydric materials listed above may be used.

Along with the polyhydric material is also charged the desired amount of a water entrainer. Ordinarily, about 15-40 weight percent of water entrainer based on polyhydric material will be added. Such water entrainers as heptane, hexane, toluene, xylene and the like may be used.

A catalytic amount of such materials as sodium acid sulphate, toluene sulfonic acid, sulfuric acid, etc. is added to the mixture of entrainer and glycol to increase the rate of reaction.

The mixture is then circulated through lines 4 and 6 into a heating zone 8 by means of a circulating pump 10. The heating zone may be a jacketed reboiler type heating zone wherein the heat exchange occurs through the walls of a plurality of tubes surrounded by the heating medium. Hot oil, Dowtherm, or other liquid heating media may be circulated through the heating zone by means of lines 12 and 14.

After passing through the heating zone, the mixture is passed through line 16 and returned to reactor 2 impinging upon splash plate 18 upon reentry into the reaction zone.

By means of this circulating system, the need for external agitation means, such as a propeller type agitator and its necessary stuffing box is eliminated. The rate of circulation may be controlled by this means so that residence time in the heating zone is as short or as long as may be desired.

When the temperature of the circulating mixture reaches the boiling point of the water entrainer-glycol mixture, refluxing commences. Entrainer vapors are taken overhead from the reactor through line 22, through the condenser 24 and the liquid passed through line 26 to separator vessel 28. Since at this time there is no water taken overhead, the condensed entrainer is returned through lines 32 and 34a by means of circulating pump 34 to the circulating system.

When reflux is well started there is added to the circulating mixture of glycol, entrainer and catalyst, the required amount of a dibasic acid, controlling the rate of addition as desired. Ordinarily 2 mols of dibasic acid per mol of the glycol are required. If the acid used is a liquid, it may be added through lines 3 or 20. If the acid is a solid, it is added from storage hopper 35 through line 36. Storage hopper 35 may be equipped with a star feeder, or other means of proportioning solids for ease in addition of the desired amount of acid.

When all or a part of the dibasic acid is added to the circulating mixture and becomes dissolved or melted therein, reaction between the acid and the glycol commences, liberating water. This water is vaporized, entrained by the entrainer vapor and the mixture of vapors taken overhead by means of line 22, condensed to liquid in condenser 24, passed through line 26 and into separator 28. Here the water separates from the entrainer in a lower layer and may be withdrawn from the separator vessel through valved line 30. The water entrainer in the upper layer is recirculated to the circulating mixture of reactants as described above. The temperature of the total circulating mixture is adjusted by means of heater 8 to a final temperature between about 360° and 400° F., and the reaction will ordinarily be completed in from 2 to 10 hours. It is allowed to continue at any event until the desired acid number is reached.

When the reaction between the dibasic acid and the polyhydric material is substantially completed, alcohol at controlled rates and amounts is added through line 20. The alcohol is ordinarily a branched chain alcohol exemplified by 2-ethylhexanol or $C_8$ Oxo alcohol. However, any of the alcohols listed above may be used. The alcohol is added in amounts at least sufficient to completely esterify the reaction product of the dibasic acid and the polyhydric material. Ordinarily about 20 to 30% excess of the alcohol will be used.

On addition of all or a part of the alcohol to the circulating stream when esterification of the reaction product with the alcohol results, foaming may occur in the system. In this system, unlike the single vessel reaction system of the prior art, foaming actually increases the rate of reaction by virtue of an increase in the rate of circulation and in the rate of heat exchange, and is beneficial rather than detrimental to the reaction. The foam can be broken down in the upper section of the reboiler by control of heat input, or upon re-entry into the reaction zone of the stream, it can be removed by means of splash plate 18.

The circulation of the total mixture is continued until the reaction is substantially completed, as evidenced by the neutralization number of the mixture. Ordinarily this reaction will be completed in from about 2 to about 10 hours at a temperature of about 400° to 430° F.

Once the reaction is substantially completed, the water entrainer and some lower boiling constituents are rejected from the reaction zone by vaporization below 430° F. and are removed through line 30.

When no more vapor is evolved from the reaction zone at 430° F., the system is placed under reduced pressure by means of a vacuum pump or a steam-jet ejector 37. The circulating materials are gradually subjected to about 10 to 30 mm. Hg vacuum at temperatures no higher than 450° F. to complete the removal of low boiling constituents, and until the desired final product viscosity is obtained (2 to 10 hours). The product is removed through valved line 38 and may be washed and treated as outlined above.

If desired there may be included in the circulating system a filter for preventing the circulation of solid catalyst with the circulating mixture. This filter is preferable located in reactor 2 at the entrance to line 4 and is adapted to be opened or closed. It may be opened to permit passage of added acid if the acid used is a solid, but closed to prevent solid catalyst circulation once the acid is melted or dissolved. It may also be desirable to equip line 4 with a by-pass system containing a second filter. Once the reaction is finished and the complex ester product prepared, the bypass line may be used to filter out the solid catalyst so that it may be discarded.

When it is desired to prepare complex esters of type II, that is, complex esters having the formula monobasic acid-glycol-(dibasic acid-glycol)$_x$-monobasic acid the procedure may be as follows.

Either the glycol or the dibasic acid is first charged to the reactor along with the entrainer and the catalyst. It will ordinarily be preferred to add the glycol first. After reaction temperature is reached there is added to the circulating stream the calculated amount of a dibasic acid or glycol, depending upon the material first added. After the esterification is completed there is added the desired amount of the monobasic acid, and the reaction carried to completion as described above.

In preparing a complex ester of type III, that is, one having the formula

Monobasic acid (glycol-dibasic acid)$_x$-Alcohol the process may be carried out as follows:

Either the glycol or the dibasic acid, preferably the former, is charged to the reactor with the catalyst and the entrainer. After reaction temperature is reached an equimolar proportion of the dibasic acid or the glycol, depending upon which reactant was previously charged to the reactor, is added and esterification carried out. After this esterification is completed, a molar quantity of a monobasic acid is charged and reacted with the unesterified group of the glycol. Then the alcohol, in molar quantities, is added to esterify the unesterified carboxyl group of the dibasic acid.

As was explained above, various modifications of the procedures may be made without departing from the spirit of the inventive concept.

An illustration of a preferred embodiment of the process of this invention is as follows:

One molar portion of a polyoxyethylene glycol of a molecular weight of about 200, 30 weight percent of toluene as a water entrainer and a catalytic amount of sodium acid sulfate is introduced into reaction zone from the hopper through valved line 36. The circulation pump 10 is started and the temperature of the circulating mixture is raised to reflux by means of heat exchanger 8.

When refluxing occurs and the refluxing system is in operation, two mols of sebacic acid are introduced gradually into the reaction zone through line 36 from hopper 35. Circulation is continued and the temperature is raised to about 365° F. maximum by means of heater 8. When a sample of the circulating stream shows a neutralization value of about 200 grams of KOH/g. of product, two mols of 2-ethyl hexanol plus about a 20% excess is gradually added to the circulating mixture through valved line 20. The temperature of the circulating mixture is increased to 400–430° F. Circulation is continued until a neutralization number of below 5 g. KOH/g. is reached. It is to be understood that circulation of the mixture through the heater is continuous throughout the total reaction time.

Once the reaction is completed, that is when the final product neutralization number is below about 5 g. KOH/g., the material taken overhead through line 22 is rejected through line 30. When all the material boiling below 430° F. is rejected at atmospheric pressure, reduction of the pressure on the system is begun by means of steam jet ejector 37. The pressure on the system is gradually lowered to a vacuum of 10 to 30 mm. Hg and material boiling below 450° F. at this pressure taken overhead, condensed and later rejected through line 30 at preferably atmospheric pressure. This stripping operation is continued until a product of desired final viscosity is obtained. The final product is then withdrawn from the reaction zone through line 38, cooled, washed and purified by methods known to the art.

It has been found in the past that the preparation of complex esters from one mol of a glycol, two mols of dibasic acid and two mols of an alcohol results in the formation of varying amounts of a diester of the dibasic acid and the alcohol. In general, it has been found that using polyoxyethylene glycol 200, sebacic acid and 2-ethyl hexanol about 35 weight percent of di-2-ethyl hexyl sebacate is formed. Although this formation of the diester is not completely objectionable in all instances, it is undesirable since it consumes about one-third of the ester ingredients intended for the complex esters.

It has now been found and forms a further object of this invention that preparation of a complex ester in the presence of varying amounts of the diester as a diluent for the reaction results in an improved complex ester material in increased yields.

Several preparations of complex esters from polyethylene glycol 200 (1 m.), sebacic acid (2 m.), and 2-ethylhexanol (2.6 m.) were made in the presence of varying amounts of di-2-ethyl hexyl sebacate as a diluent. Sodium acid sulfate was used as a catalyst for the reaction and both one step and two step procedures were used. The results indicate that the formation of diesters from the complex ester starting materials may be greatly reduced by this method. Set out in tabular form below are the series of experiments according to the inventive concept.

Table I.—Effect of diester diluent in complex ester preparations

| Percent diester diluent | Weight percent diester in product | Weight percent diester from complex ester ingredients |
| --- | --- | --- |
| 0 | 35 | 35 |
| 28 | 49 | 23 |
| 41 | 55 | 14 |
| 55 | 64 | 9 |
| 70 | 74 | 4 |

It will be noted that as the amount of the diester diluent increases from 0% to 70 wt. percent of the total diester-complex ester ingredient charge, the weight percent of diester prepared from the complex ester starting materials decreases from 35% to 4%. This decrease in utilization of the complex ester starting materials in the formation of undesirable diesters represents a considerable saving in manufacturing costs.

It is also extremely interesting and unexpected to find that the complex ester materials prepared as described above exhibit a markedly improved resistance to low temperature thickening. It has been found in the past that complex esters of the type contemplated herein exhibit an undesirable thixotropy upon standing at low temperatures. Since an important use of these complex esters is the lubrication of jet engines operating at extremely high altitudes where temperatures of as low as —50° F. are encountered, this thixotropic effect is extremely undesirable since it may cause loss of lubrication and hence engine failure under these extreme conditions.

Table II.—Low temperature thixotropy of complex ester lubricants

| | Lubricant A blend of 75% complex ester-25% diester | Lubricant B 85% complex ester in 15% diester diluent |
| --- | --- | --- |
| Viscosity, cs. at ° F.: | | |
| 210 | 8.18 | 8.16 |
| —40 | | |
| Determined at: | | |
| Hour 0.5 | 13,990 | 12,740 |
| Hour 1.0 | 13,990 | 12,740 |
| Hour 24.5 | Too viscous to complete. Estimated to be >100,000. | 13,280 |
| Hour 25.0 | | 13,190 |

A = complex ester prepared in absence of diester diluent according to the prior art.
B = prepared in the presence of 15% diester as a diluent using one mol of polyethylene glycol 200, two mols of sebacic acid and two mols of 2-ethyl hexanol.

It will be noted that the complex ester prepared in accordance with prior art methods show a decided thixotropic effect in blends having a common viscosity of about 8 cs. on being subjected to —40° F. for 25 hours, whereas the complex ester prepared in accordance with this invention does not change appreciably in viscosity after this treatment.

To illustrate the fact that the materials prepared in accordance with this invention have outstanding lubricating properties, the preparations reported in Table I were subjected to standard ASTM inspections for lubricants. The results of these inspections are set out in Table III.

It will be seen that the ASTM inspection data on the materials prepared in accordance with the instant invention show that these materials possess properties characteristic of excellent and outstanding synthetic lubricants.

If it is desired, the diester diluent may be added to reaction zone 2 through valved line 3 along with the polyhydric material and the water entrainer. It may also be desired to add the diester component through valved line 20 to the circulating mixture.

Although the data reported above shows the advantages of using from 25% to 75% of diester as a diluent, it will be understood that from about 5% to about 95% of the diester, based on the total weight of the diester and the complex ester ingredients, may also be used.

It is also within the concept of this invention to prepare the complex esters as described above in the presence of an excess of a glycol and an excess of a dibasic acid. The following examples set out in detail the preparation of a series of esters which are modified by the presence of an excess glycol (1.0 m.) and excess sebacic acid (1.0 m.), and 0% and 30% excess 2-ethylhexanol.

*Table III.—Properties of complex ester—diester compositions*

| Wt. percent diester diluent in feed | Wt. percent diester in product | Viscosity, cs. at ° F. | | | V. I. | Pour pt., ° F. | Flash pt., ° F. | Fire pt., ° F. | Neut. No. | Hydroxyl No. |
| --- | --- | --- | --- | --- | --- | --- | --- | --- | --- | --- |
| | | 210 | 100 | −40 | | | | | | |
| 0 | 35 | 9.95 | 51.1 | 20,570 | 152 | −65 | 495 | 545 | 0.1 | 4.0 |
| 26 | 49 | 7.04 | 32.9 | 8,790 | 159 | <−75 | 475 | 510 | 0.14 | 2.5 |
| 41 | 55 | 6.33 | 28.6 | 6,500 | 162 | <−75 | 475 | 515 | 0.16 | 1.3 |
| 55 | 64 | 5.45 | 23.8 | 4,630 | 167 | <−75 | 460 | 510 | 0.07 | 1.6 |
| 70 | 74 | 4.62 | 19.2 | 3,040 | 174 | <−75 | 470 | 495 | 0.03 | 1.6 |

Two preparations of complex esters from polyethylene gylcol 200 (3 m.), sebacic acid (2 m.) and 2-ethylhexanol (2 m. + excess) were made. In one preparation no excess of 2-ethylhexanol was added; in the other preparation a 30% excess (0.6 m.) was introduced. The ingredients were esterified substantially as described above. The products possessed the following properties:

COMPLEX ESTER PREPARATIONS

[3 m. sebacic acid+2 m. glycol+2 m. 2-ethylhexanol.]

| | Viscosity, cs. at ° F. | | | V. I. | Pour pt., ° F. | Flash pt., ° F. | Neut. No. |
| --- | --- | --- | --- | --- | --- | --- | --- |
| | 210 | 100 | 0 | | | | |
| 0% excess 2-ethylhexanol | 28.5 | 197 | 10,260 | 137 | −45 | 535 | 0.6 |
| 30% excess 2-ethylhexanol | 20.4 | 123 | 5,535 | 142 | −45 | 505 | 0.2 |

It will be seen that the complex esters prepared in the presence of excess acid and glycol either with or without excess alcohol has lubricating properties such as higher viscosities and flash points which make them superior or more attractive for certain applications than those made by the prior art method.

To summarize briefly, the instant invention relates to improved complex esters and processes for their preparation. Specifically, the invention relates to an improved process for the preparation of complex ester materials having utility as synthetic lubricants. The process comprises the steps of adding to a reaction zone a mixture of polyhydric material, catalyst, a water entrainer and, if desired, a diester diluent, continuously circulating the mixture through a heating zone containing a plurality of tubes around which is circulated a heating medium, returning said heated mixture continuously to a reaction zone, adding in controlled amounts to the circulating mixture the desired amount of a dibasic acid, continuing the circulation until the reaction product of said dibasic acid and said polyhydric material is formed, adding to said circulating reaction product an alcohol, continuing said circulation until said reaction product is substantially completely esterified with said alcohol, increasing the temperature in said heating zone and continuously removing lower boiling constituents from said reaction zone through a condenser and into a separation zone, continuously removing and discarding the water layer from said separation zone, and continuously recirculating the oil layer from said separation zone into said reaction zone until a final product of desired viscosity is obtained in said reaction zone. If desired the dibasic acid and alcohol may be first circulated, followed by the addition of the glycol or as in a one-step process, all of the ingredients may be circulated initially until the desired crude complex is obtained.

Particularly desirable polyhydric materials are the glycols such as the polyalkylene glycols exemplified by polyoxythylene glycol of a molecular weight of about 200, dibasic acids such as adipic, suberic, azeleic and sebacic acids and alcohols such as iso octyl alcohol, 2-ethylhexanol and other branch chain alcohols containing from about 4 to about 10 carbon atoms.

Although the above description details the preferred embodiment of the invention, a process for the preparation of complex esters of type I, it is also within the inventive concept to produce complex esters of types II and III. Thus, the process comprises the steps of adding to a reaction zone an organic compound containing at least two esterifiable radicals, an esterification catalyst and a volative liquid hydrocarbon water entrainer, continuously circulating said mixture through a heating zone and back to said reaction zone, adding in controlled rates a second organic compound containing at least two radicals capable of esterifying the radicals of said first organic compound in amounts sufficient to leave two unesterified radicals present, continuing said circulation and removing water formed until only two unesterified radicals are present, adding to said circulating mixture in controlled rates a third organic compound capable of esterifying at least one of the two unesterified radicals, continuing said circulation and removing water formed until the esterification of at least one of the two unesterified radicals is substantially complete, adding in controlled amounts a fourth organic compound capable of esterifying any unesterified radicals, continuing said circulation until all esterification is complete, further heating said circulating mixture, continuously removing water, water entrainer, and boiling constituents from said reaction zone until a final product of desired viscosity is obtained in said reaction zone, and removing and purifying said final product. Thus, according to this procedure, an organic compound containing at least two esterifiable groups, usually either a glycol or a dibasic acid is charged to the reaction zone followed by the second compound capable of esterifying the radicals or groups of the first, usually a glycol or a dibasic acid, depending upon which is charged first. Subsequently either a monobasic acid, an alcohol, or both is charged to complete the formation of the complex ester of either type I, type II or type III.

The complex ester synthetic lubricants prepared as described hereinbefore may be admixed with mineral oils, either as concentrates or as finished blends. They may also be blended with other synthetic lubricants such as dibasic acid esters, complex esters, polymerized hydrocarbons, glycol ethers, glycol ether esters, formals and the like. They are also compatible with any of the well-known additive materials, and finished blends may comprise a major proportion of these complex esters alone or blended with other lubricants and minor proportions of such agents as viscosity index improvers, pour point depressants, detergent inhibitors, antioxidants, rust inhibitors, extreme pressure agents and the like.

What is claimed is:

1. A process for the preparation of complex ester synthetic lubricants having improved thixotropic characteristics which comprises the steps of esterifying at least one mol of a polyoxyalkylene glycol with at least two mols of an aliphatic dicarboxylic acid selected from the group consisting of adipic, suberic, azelaic and sebacic acid and excess of two mols of an aliphatic monohydric alcohol having from 4 to 10 carbon atoms per molecule in the presence of an esterification catalyst and in the presence of from 25% to 75% by weight, based on the weight of the total product, of a $C_4$ to $C_{10}$ alkyl diester of said aliphatic dicarboxylic acid.

2. A process for the preparation of complex ester synthetic lubricants which comprises the steps of esterifying a polyoxyalkylene glycol having a molecular weight of about 200 with two mols of sebacic acid and excess of two moles of 2-ethylhexanol in the presence of a catalytic amount of sodium acid sulfate and in the presence of from 25% to 75% by weight, based on the weight of the total product, of di-2-ethylhexyl sebacate as a diluent.

3. Complex ester synthetic lubricants prepared in accordance with the process of claim 1.

4. Complex ester synthetic lubricants prepared in accordance with the process of claim 2.

References Cited in the file of this patent

UNITED STATES PATENTS

| | | |
|---|---|---|
| 2,232,674 | Pyzel | Feb. 18, 1941 |
| 2,392,621 | Strain | Jan. 8, 1946 |
| 2,405,967 | Loder | Aug. 20, 1946 |
| 2,499,983 | Beavers | Mar. 7, 1950 |
| 2,575,195 | Smith | Nov. 13, 1951 |
| 2,575,196 | Smith | Nov. 13, 1951 |
| 2,666,781 | Ford | Jan. 19, 1954 |
| 2,695,279 | Kahn et al. | Nov. 23, 1954 |
| 2,703,811 | Smith | Mar. 8, 1955 |